(No Model.)
W. W. MOORE.
BROOM OR BRUSH HOLDER.
No. 504,887.      Patented Sept. 12, 1893.
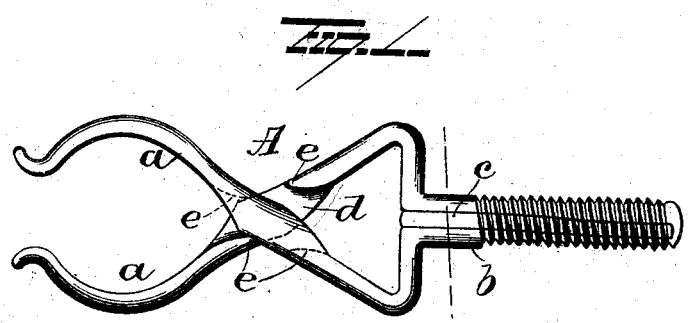
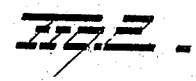
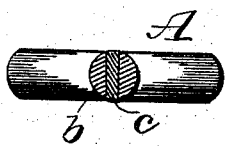
Witnesses
E. F. Nottingham
G. F. Downing
Inventor
W. W. Moore
By K. A. Seymour
Attorney

United States Patent Office.

WILLIAM W. MOORE, OF PHILADELPHIA, PENNSYLVANIA.

BROOM OR BRUSH HOLDER.

SPECIFICATION forming part of Letters Patent No. 504,887, dated September 12, 1893.

Application filed September 28, 1892. Serial No. 447,110. (No model.)

*To all whom it may concern:*

Be it known that I, WILLIAM W. MOORE, a resident of Philadelphia, in the county of Philadelphia and State of Pennsylvania, have invented certain new and useful Improvements in Broom or Brush Holders; and I do hereby declare the following to be a full, clear, and exact description of the invention, such as will enable others skilled in the art to which it appertains to make and use the same.

My invention relates to an improvement in broom and brush supports,—the object of the invention being to produce a broom and brush support which shall be simple in construction, cheap to manufacture and effectual in the performance of its functions.

With this object in view the invention consists in certain novel features of construction and combinations and arrangements of parts as hereinafter set forth and pointed out in the claims.

In the accompanying drawings: Figure 1 is a view of my improved support. Fig. 2 is a sectional view of the same. Fig. 3 is a view of a modification.

A represents my improved support comprising two jaws $a$, $a$, and an integral screw-threaded portion $b$. In making the device a piece of spring metal is bent upon itself so as to form a shank $b$ at one end and preferably welded between the parts of the shank is a plate or strip of metal $c$ to give the proper body to said shank, said shank being also screwthreaded. From the end of the shank $b$ the metal is bent laterally and then forwardly in diagonal directions to form the jaws $a$, $a$. The jaws $a$, $a$ are made to cross each other and at the point of crossing each is made with a recess $d$ so that the extremities of the jaws which receive the broom, brush or other device to be supported, will be in proper alignment with each other. The shoulders $e$ at the ends of the recesses $d$ serve to limit the movement of the jaws in both directions.

Instead of making the device as above described it may be made as shown in Fig. 3, in which case the part forming the jaws will be made of a single piece of metal, and the screw $f$ by means of which the holder is secured to a stationary object secured thereto by means of solder or otherwise.

The device, constructed and arranged as above described, is very simple in construction, cheap to manufacture, ornamental in appearance, is capable of supporting a broom, brush or other device, and is effectual in the performance of its functions.

Having fully described my invention, what I claim as new, and desire to secure by Letters Patent, is—

1. As an article of manufacture, a holder for brooms or similar articles consisting of spring jaws made of a single piece of material, said jaws crossing each other at a point approximately mid-way between their ends, and a screw threaded shank, substantially as set forth.

2. As an article of manufacture a holder for brooms and like articles consisting of a pair of spring jaws crossing each other diagonally at a point between their ends, shoulders formed on the jaws to limit their vibrations and a screw threaded shank, substantially as set forth.

3. As an article of manufacture, a holder for brooms and like articles consisting of a pair of spring jaws crossing each other, and a screw threaded shank integral with the jaws, substantially as set forth.

4. A holder for brooms, brushes and similar articles composed of spring jaws and a screwthreaded shank made of a single piece of metal, and a plate or strip inserted between the parts of the shank, substantially as set forth.

In testimony whereof I have signed this specification in the presence of two subscribing witnesses.

WILLIAM W. MOORE.

Witnesses:
H. R. SHULTZ,
S. G. SIMPSON.